Aug. 18, 1964  J. C. JOHNSON  3,144,730
TRANSPARENT BOWL DISPLAY
Filed May 16, 1962
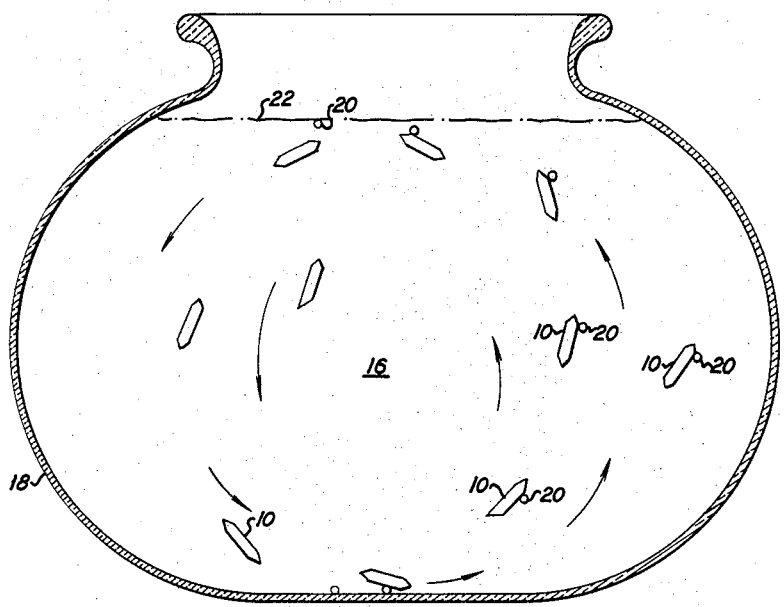
Fig.1
   
Fig.2   Fig.3
INVENTOR
JOHN CLIFFORD JOHNSON
BY
ATTORNEY United States Patent Office 3,144,730
Patented Aug. 18, 1964

3,144,730
TRANSPARENT BOWL DISPLAY
John Clifford Johnson, 1425 H St. NW., Apt. 413,
Washington, D.C.
Filed May 16, 1962, Ser. No. 195,180
3 Claims. (Cl. 46—91)

This invention relates to an ornamental device comprising ascending and descending objects, such as pellets, contained in a transparent bowl, activated to semi-continuous motion by ascending to the surface of the liquid in which it is immersed and then descending in continuous random, but relatively vertical, motion.

My ornamental device comprises a container of liquid such as water, at least some of the container walls being transparent so that the liquid body is freely observable, the water having suspended therein small variously shaped plastic bodies. The plastic bodies, herein termed "pellets," as further defined below, are unique in having a specific gravity just exceeding the specific gravity of the liquid body, the water, so that they will generally sink to the bottom of the container when it is filled with ordinary water or similar liquid, hereinafter referred to as water. The plastic bodies are formed of a specific plastic substance having critical surface characteristics whereby it readily adheres to gaseous carbon dioxide bubbles continuously evolved by the water, and by such gas bubble adhesion the pellets are buoyed to float to the surface. The pellets are sized to float upward relatively slowly in the body of water, and upon reaching the surface will have only enough impact velocity to break the liquid film to release the bubble through the surface, whereupon the plastic pellet, losing its buoyancy-imparting bubble, will sink slowly toward the bottom of the container until another evolved gas bubble attaches to it. Inasmuch as the gravity of the pellet only slightly exceeds that of the aqueous medium, a pellet without a bubble will descend slowly and will eventually capture other bubbles to have its gravity reduced only slightly below that of the water for slow ascent back to the surface. In this manner, a constant random vertical motion, both ascending and descending, will be imparted to several pellets disposed in the liquid body.

The liquid body of water in which the pellets are disposed is first treated with a carbon dioxide evolving substance whereby a substantial amount of carbon dioxide becomes dissolved in the water to substantially its saturation point whereby the pellets themselves, in contact with the carbon dioxide saturated water, form a body upon which the dissolved gas may attach upon being ejected and evolved from the aqueous solution. The carbon dioxide bubbles are only small but, nevertheless, sufficient to change the gravity of the pellet enough to cause it to float.

The pellet operates as a precipitating medium upon which the gases are deposited as they come out of true solution in the water. For this purpose the pellet is formed of a solidified gel obtained from a plastisol which, as is known in the art, is a critically plasticized polyvinyl chloride. This plastic substance is unique in that it tends to be wetted by or adheres to the evolved carbon dioxide, a property which is not found in any other plastic, of which I have tried many. Consequently, my system comprises a transparent aqueous solution of carbon dioxide in a saturated condition at ambient temperatures and pressures, in which the solidified plastisol pellets operate as crystallizing bodies upon which the carbon dioxide will be evolved from the solution and to which it will adhere in small bubbles. The solidified plastisol, moreover, is critically weighted to a specific gravity just slightly exceeding that of the liquid transparent medium, such as water, whereby the bubbles adhered to a pellet will reduce its specific gravity below that of water, causing it to slowly rise to the surface of the deep body of water. Moreover, the speed of flotation of the solidified plastisol pellet, raised from the bottom to the top of the liquid body by an adhered bubble, is such that upon striking the top surface it will allow penetration of the bubble and its release from adhesion to the plastisol surface whereby the pellet, without the critical buoyancy, then sinks.

While various shaped pellet bodies are intended to be included by this term, I prefer a pellet which is about ¼ to ¾" long and of a cylindrical contour like a conventional capsule. The ends of the pellet may be rounded or, preferably, acicular.

For the benefit of the ornamental effect, the liquid body such as water may be colored or left colorless, in any case transparent. Particularly the pellets are attractively colored either in solid colors or stripes for attractiveness. Sometimes it is advantageous for improved attractiveness to use fluorescent colors, including glittering particles such as granules or flakes of metal, mica or pearl essence.

In order to impart the desired carbon dioxide content to the water, it is preferably treated either with an acid substance which may be an inorganic or organic acid, such as citric or tartaric acid, or with an acid salt such as sodium acid phosphate or sodium bitartrate. The carbon dioxide itself may be made available from a carbonate salt such as sodium carbonate or, preferably, sodium bicarbonate. Thus, it is useful to add many typical carbon dioxide evolving mixtures of acidic substance and carbonate components as listed above to the water bath. In the presence of water the components will react to evolve carbon dioxide bubbles as a fizz, immediately expelling the excess $CO_2$ as a gas, but allowing dissolution of enough carbon dioxide in the water to form a substantially saturated $CO_2$ condition at the ambient temperature and pressure conditions. The water body may also be charged by a solution of gaseous or solid carbon dioxide; for instance, pre-charged $CO_2$ solution or a chip of Dry Ice can be added to the water body, or $CO_2$ gas can be bubbled through the water for charging it. In any case, the water is first charged with carbon dioxide to an approximate saturated condition at ambient conditions whereby upon placing the pellets therein the random motion described above by evolution of carbon dioxide bubbles adhering to the pellets will take place and continue for long periods of time. While pure water is preferred as the medium, other aqueous liquids may be used which do not interfere with the normal adhesive wettability of the plastisol pellets by the evolving carbon dioxide gas.

The invention is further described in relation to the drawings wherein:

FIG. 1 shows a bowl and moving pellets therein,

FIG. 2 shows a cylindrical pellet having round ends, and

FIG. 3 shows a pellet with acicular ends.

As shown in FIG. 2, the pellet 10 may be variously colored for attractiveness and may have round ends 12 or as in FIG. 3 sharp ends 14. The pellets 10 are placed in the water 16 of the transparent bowl 18 and, after saturation of the water with $CO_2$ gas, the pellets move up and upon the attached bubble 20 to the top surface 22, discharge the bubble, and then descend.

In operation of the device, a bowl of the character of a small fish bowl may be substantially filled with ordinary pure water, tap water or distilled water. The water in the bowl, exposed at the top to the air and at ambient temperature, is then charged with a few crystals of acid and carbonate salt; for example, citric acid and sodium bicarbonate, whereby the excess carbon dioxide is evolved as a fizz, thus charging the bath with dissolved carbon dioxide. The pellets are then placed in the water, and the ornamental phenomenon of rise and fall as described takes place and continues for many hours. The bath may be replenished from time to time with additional carbon dioxide, and, to be certain that the wettability of the pellets is not diminished, it is often desirable to cleanse them of any precipitated salts that may have been present in commercial water.

Certain modifications for enhanced ornamental effects will occur to those skilled in the art, and it is, accordingly, intended that the description herein be regarded as illustrative and not limiting except as defined in the claims appended hereto.

I claim:

1. An ornamental device comprising a container having a transparent wall visibly enclosing a body of water, said water having dissolved therein carbon dioxide gas which is formed by the reaction of a water soluble acid substance and a water soluble carbonate salt, said container having disposed therein a plurality of irregularly shaped pellets formed of water insoluble plastic to which carbon dioxide gas bubbles evolved from said solution are adherent, said pellets having a specific gravity so slightly exceeding that of the liquid as to tend to sink in the water, but less than that of water when made slightly buoyant by attached bubbles, whereby said pellet bodies rise and fall for an extended time period at varying rates in the water as gas bubbles evolved in the water attach themselves to said pellets, float the pellet bodies upwardly to the water surface, where the adherent bubbles are discharged and then sink.

2. Ornamental device as defined in claim 1 wherein the water insoluble plastic is plasticized polyvinyl chloride.

3. The device as defined in claim 1 wherein the acid substance is a member of the group consisting of citric acid, tartaric acid, sodium bitartrate and sodium acid phosphate and the carbonate is a member of the group consisting of alkali metal carbonates and bicarbonates.

References Cited in the file of this patent

UNITED STATES PATENTS

| 2,361,423 | Snyder | Oct. 31, 1944 |
| 2,498,074 | Feldman | Feb. 21, 1950 |
| 3,009,286 | Warner | Nov. 21, 1961 |